Sept. 10, 1946.  J. JANDASEK  2,407,497
FLUID TRANSMISSION
Filed Oct. 13, 1943

INVENTOR.
Joseph Jandasek.
BY
A. E. Wilson.
ATTORNEY.

Patented Sept. 10, 1946

2,407,497

UNITED STATES PATENT OFFICE 2,407,497

FLUID TRANSMISSION

Joseph Jandasek, Highland Park, Mich., assignor to Bendix Aviation Corporation, South Bend, Ind., a corporation of Delaware Application October 13, 1943, Serial No. 506,024

13 Claims. (Cl. 60—54)

This invention relates to transmissions and more particularly to fluid transmissions wherein speed controlled means are employed to vary the power transmitting characteristics of the device.

An object of this invention resides in the provision of auxiliary fluid energizing and energy absorbing fluid deflecting members having vanes of varying contour adapted to be positioned in the power transmitting fluid circuit to vary the power transmitting characteristics of the device in accordance with variations of speed of the rotatable members.

A further object of the invention is to provide a fluid transmission having an impeller and a turbine cooperating to form a power transmitting fluid circuit, wherein an auxiliary impeller and an auxiliary turbine having high and low speed rectifying vanes controlled by variations of speed of the impeller and turbine are provided to vary the power transmitting characteristics of the device.

Another object is to provide a fluid transmission including a speed controlled guide wheel having spaced channeled portions adapted to operate the device as a torque converter or as a fluid clutch.

Yet another object of the invention resides in the provision of a fluid transmission having an auxiliary impeller provided with contoured vanes of varying curvature driven by a main impeller member and controlled by speed responsive means to vary the fluid energizing characteristics of the device.

Another object resides in the provision of a fluid transmission having an auxiliary turbine provided with vanes of varying contour adapted to be positioned in the power transmitting fluid circuit to vary the energy absorbing characteristics of the device in accordance with variations of speed of a turbine member.

Other objects and advantages of this invention will be apparent from the following detailed description considered in connection with the accompanying drawing, submitted for purposes of illustration only and not intended to define the scope of the invention, reference being had for that purpose to the subjoined claims.

In the drawing wherein similar reference characters refer to similar parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Figure 1:
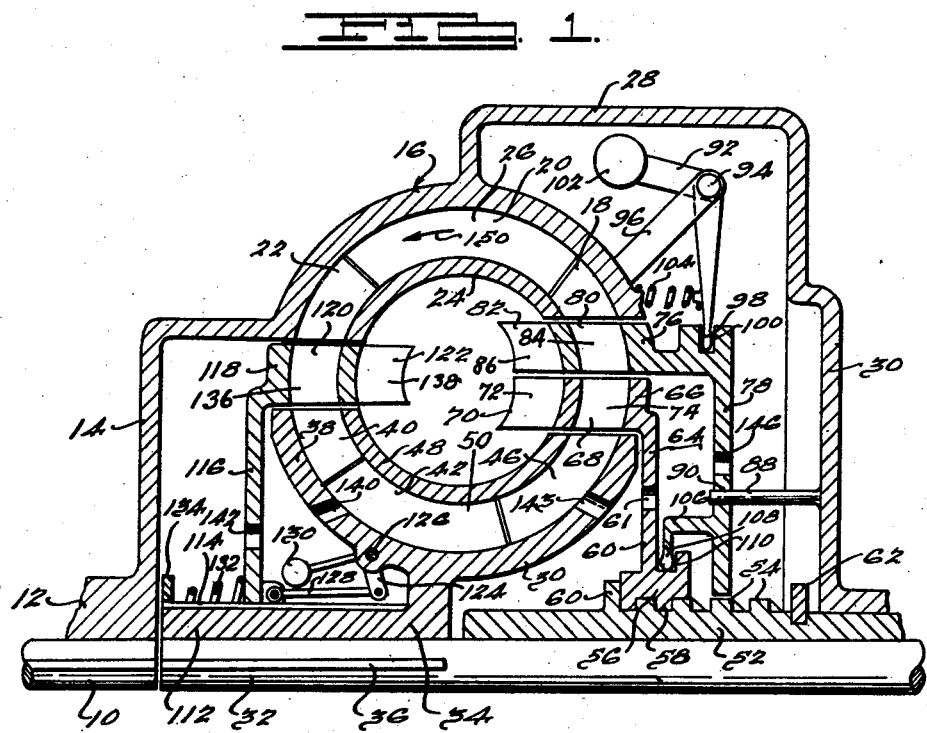
Fig. 1 is a longitudinal sectional view of a transmission embodying the present invention.

Referring now more particularly to Fig. 1 it will be observed that a driving shaft 10 has thereon a hub 12 supporting a flange 14 carrying an impeller housing 16 having on its inner wall fluid energizing vanes 18, 20 and 22 supporting a shroud member 24. This structure provides an impeller channel 26 between the housing 16 and the shroud 24 respectively.

The housing 16 has an axially extended flange 28 terminating in an inwardly directed flange 30. It will be apparent that the impeller housing 16 and the flanged portions 28 and 30 may be formed as separate elements if desired and attached together in any suitable manner as by means of bolts.

A driven shaft 32 preferably aligned with the driving shaft 10 has thereon a hub 34 secured against displacement as by a key 36. The hub 34 has a turbine web 38 carrying suitable energy absorbing vanes 40, 42 and 46 secured to a shroud member 48. This structure provides a turbine channel 50 between the web and shroud 38 and 48 respectively.

The impeller channel 26 and the turbine channel 50 cooperate to provide a power transmitting fluid circuit whereby fluid may be energized in the impeller channel and the energy absorbed from the circulating fluid in the turbine channel to transmit power from the driving shaft 10 to the driven shaft 32.

A stationary member 52 receiving the driven shaft 32 has helical threads 54 for the reception of a guide wheel hub 56 having internal helical threads 58 meshing with the threads 54 so that the guide wheel may shift axially on the stationary member between spaced stop members 60 and 62. The guide wheel hub 56 has a flange 64 supporting a guide wheel 66 having spaced channels 68 and 70 adapted to be introduced into the power transmitting fluid circuit.

Figures 2, 3, 4:
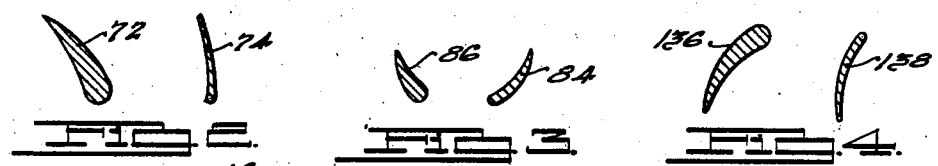
Fig. 2 is a diagrammatic view illustrating the blades of the guide wheel member.
Fig. 3 is a view similar to Fig. 2 illustrating the vanes of the auxiliary impeller.
Fig. 4 is a view similar to Fig. 2 illustrating the vanes of the auxiliary turbine vanes.

The channel 70 is provided with vanes 72 of relatively large cross section embodying considerable curvature as illustrated in Fig. 2 to deflect the fluid issuing from the turbine channel 50 and rectify its direction of flow to operate the device as a torque converter so as to transmit multiplied torque at reduced speed.

The channel 68 is provided with vanes 74 of a smaller cross section embodying less curvature to decrease the deflection of the fluid to operate the device as a fluid clutch to transmit power at higher speed with substantially no torque multiplication.

Preferably interposed between the guide wheel 66 and the main impeller channel 26 is an auxiliary impeller 76 carried by a flange 78 supported concentrically with relation to the stationary member 52. The auxiliary impeller member 76 is provided with spaced channels 80 and 82 to vary the energizing characteristics of the device.

The channel 82 is adapted to be introduced in the power transmitting fluid circuit when the device is operating at relatively slow speed as a torque converter to transmit multiplied torque. This channel 82 is provided with fluid deflecting vanes 86 of relatively large cross-section embodying considerable curvature as illustrated in Fig. 3. These vanes 86 act as low speed rectifying vanes to deflect the fluid, imparting a desired amount of energy thereto and inducing it to enter the main impeller channel 26 at such an angle that turbulence is minimized.

The channel 80 is provided with high speed rectifying vanes 84 as illustrated in Fig. 3 of smaller cross-section to deflect the power transmitting fluid to minimize turbulence and impart a desired degree of power thereto when the device is operating as a fluid clutch with the channeled portions 68 of the guide wheel member 66 in the power transmitting fluid circuit.

Driving means are provided between the main impeller and the auxiliary impeller member 76. This driving means may be of any desired form such for example as spaced pins 88 carried by the flange 30 of the impeller housing 16 and extended through spaced apertures 90 in the flange 78 of the auxiliary impeller member 76 in such a manner as to drive the auxiliary impeller carrying flange 78. It will be noted that this driving connection permits the flange 78 to move axially relative to the driven shaft 32 and the stationary member 52 to successively introduce the channels 80 and 82 in the power transmitting fluid circuit.

Speed responsive means may be provided to control the position of the auxiliary impeller member 76 relative to the fluid circuit. One desirable form of a suitable speed responsive means comprises a bell-crank 92 pivoted at 94 on an arm 96 carried by the impeller housing 16 and having an actuating projection 98 extending into a slot 100 formed in the auxiliary impeller member 76. The opposite ends of the bell-crank 92 is provided with a weight 102 adapted to swing outwardly under the influence of centrifugal force caused by rotation of the impeller housing 16 to actuate the auxiliary impeller member 76 against the resistance of a spring 104 so as to introduce the channel 80 into the power transmitting fluid circuit when the device is operating as a fluid clutch.

Means may be provided to control the guide wheel 66 in accordance with the position of the auxiliary impeller 76 to provide speed control means for the guide wheel. One desirable form of such control means comprises an extension 106 on the auxiliary impeller supporting a flange 78 having a rounded edge 108 received by a slot 110 in the guide wheel hub 56 to insure movement of the guide wheel 66 with the auxiliary impeller 76.

It will be apparent that the angle of the helical threads 54 and 58 may be varied to obtain the desired operating characteristics. If desired the helical threads 54 and 58 on the stationary member 52 and the guide wheel hub 56 may be dispensed with, and the hub merely slide axially on the stationary member.

The turbine hub 34 has an axially extended portion 112 externally splined as at 114 for the reception of an internally splined radially extended flange 116 carrying an auxiliary turbine 118. The turbine 118 has spaced channels 120 and 122 adapted to be successively introduced in the power transmitting fluid circuit when the device is operating as a torque converter or as a fluid clutch.

Speed responsive actuating means may be provided to control the auxiliary turbine 118 relative to the power transmitting fluid circuit. One desirable form of such control means comprises a bell-crank 124 pivoted at 126 on the turbine web 38. One end of the bell-crank 124 is connected through a link 128 to the flange 116 to move it on the splines 114 of the axially hub extension portion 112. The other end of the bell-crank 124 is provided with a weight 130 adapted to swing outwardly under the influence of centrifugal force to shift the auxiliary turbine toward the left as viewed in Fig. 1 to introduce the channel 122 into the fluid circuit during high speed operation when the device is operating as a fluid clutch. A spring 132 interposed between the flange 116 and a stop member 134 is provided to yieldingly urge the auxiliary turbine 118 to introduce the channeled portion 120 in the fluid circuit to operate the device as a torque converter.

The channel 120 of the auxiliary turbine 118 is provided with low speed rectifying vanes 136 of relatively large cross section embodying considerable curvature to absorb a relatively high proportion of power from the circulating fluid when the device is operating as a torque converter and to deflect the fluid in such a manner as to minimize fluid turbulence as it enters the main turbine.

The channel 122 is provided with high speed rectifying vanes 138 of smaller cross section embodying less curvature to absorb a lesser degree of power from the power transmitting fluid when the device is operating as a fluid clutch to transmit power with substantially no torque multiplication.

The left side of the turbine web 38 is provided with spaced calibrated orifices 140 to permit the flow of a predetermined quantity of fluid therethrough. The auxiliary turbine carrying flange 116 is also provided with spaced orifices 142 to permit predetermined quantities of fluid to flow therethrough to subject the flange 116 to predetermined pressure urging it toward the right as viewed in Fig. 1 to introduce the channel 120 into the power transmitting fluid circuit when the device is operating as a fluid clutch.

The right side of the turbine web 38 is also provided with calibrated orifices 143 to permit a predetermined quantity of fluid to flow therethrough to exert force on the inner surface of the guide wheel carrying flange 64. The flange 64 and the auxiliary impeller carrying flange 78 are provided with calibrated orifices 144 and 146 to subject these flanges to substantially predetermined fluid pressures urging them toward the high speed low load torque converter position of operation.

The operation is as follows: Power applied to the driving shaft 10 rotates the impeller housing 16 to energize fluid and move it in the direction of the arrow 150. Energy imparted to the fluid is absorbed by the vanes 40, 42 and 46 carried by the turbine web 38, and this power is transmitted through the turbine hub 34 to the driven shaft 32.

When power is being transmitted at low speed as when torque multiplication is desired to transmit increased torque at reduced speed, the spring 104 urges the bell-crank 92 in a counterclock-wise direction about its pivot 94 to introduce the channel 70 of the guide wheel 66, and the channel 82 of the auxiliary impeller 76 into the power transmitting fluid circuit.

The guide wheel vanes 72 (Fig. 2) of large curvature deflect the fluid in such a manner that torque may be multiplied to operate the device as a torque converter to transmit increased torque to the driven shaft 32 at reduced speed. The low speed rectifying vanes 86 (Fig. 3) of the auxiliary impeller 76 impart energy to the fluid issuing from the guide wheel channel 70 and direct it to the main impeller channel 26 at a desired angle to minimize fluid turbulence. During this phase of the operation the channel 120 of the auxiliary turbine 118 is in the power transmitting fluid circuit whereupon the vanes 136 (Fig. 4) of large curvature are effective to absorb a relatively high proportion of power from the power transmitting fluid before it flows into the main turbine channel 50 where the remaining extractible portion of the power is absorbed from the fluid.

As the load on the turbine shaft 32 decreases, or the power applied to the driving shaft 10 increases to such a point that torque multiplication is no longer necessary, the impeller and turbine speed up. The weight 102 on the bell-crank 92 moves the bell-crank 92 in the clockwise direction thereby shifting the channel 68 of the guide wheel 66 and the channel 80 of the auxiliary impeller into the power transmitting fluid circuit.

The vanes 74 (Fig. 2) in the guide wheel channel 68 exert decreased deflection on the power transmitting fluid and direct it to the auxiliary impeller channel 80 in such a manner that the device operates as a fluid clutch to transmit power from the driving shaft 10 to the driven shaft 32 with substantially no torque multiplication.

The vanes 84 (Fig. 3) in the channel 80 of the auxiliary impeller 76 exert less deflecting force on the fluid and therefore impart thereto a lesser degree of energy.

It will be noted that the guide wheel 66 is moved axially relative to the fluid circuit by the actuating portion 108 of the flange 106 carried by the auxiliary impeller flange 78. Since the auxiliary impeller 76 is controlled by speed responsive means, the position of the guide wheel member 66 is also controlled by speed responsive means.

The driving pins 88 carried by the flange 30 of the impeller housing 16 engaging in the apertures 90 of the auxiliary impeller carrying flange 78 serve to rotate the auxiliary impeller 76 with the impeller housing 16 and driving shaft 10.

As the device speeds up due to a reduction of the load on the driven shaft 32, or to an increase in the power applied to the driving shaft 10, the weight 130 oscillates the bell-crank 124 carried by the turbine web 38 in the clockwise direction to shift the auxiliary turbine 118 toward the left as viewed in Fig. 1 to introduce the channel 122 having the fluid deflecting vanes 138 (Fig. 4) of thinner cross section and less curvature into the power transmitting fluid circuit whereupon decreased power is absorbed from the fluid by the auxiliary turbine member while the device is operating as a fluid clutch.

Figure 5:
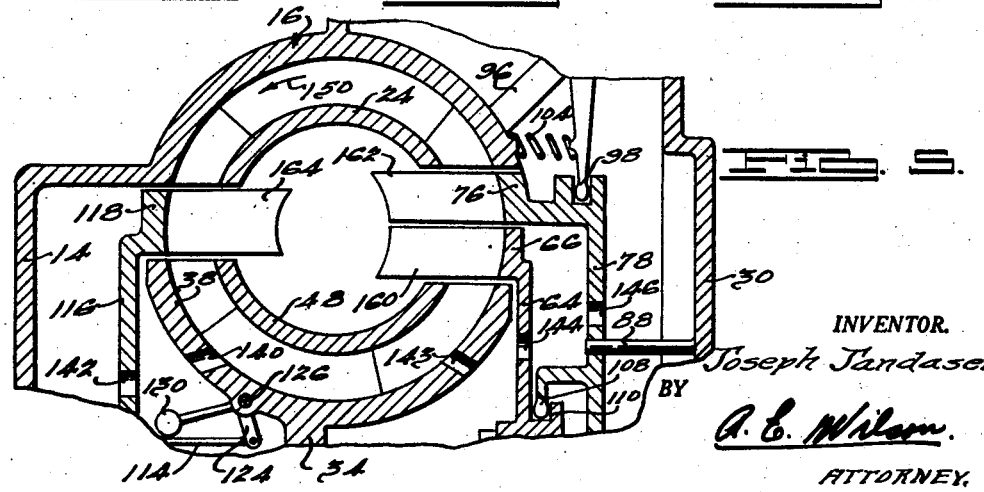
Fig. 5 is a fragmentary sectional view of a modified form of vane structure having helically shaped vanes employed in the auxiliary guide wheel, impeller and turbine members.

In the embodiment of the invention illustrated in Fig. 5 the guide wheel 66 is provided with fluid deflecting vanes 160 of helical form. The left hand end of the vanes 160 are of relatively large cross section and embody considerable curvature as illustrated at 72 in Fig. 2 for operating the device as a torque converter. The cross section of the vanes 160 and their angle of curvature progressively decrease toward the right and at the right hand portion embody a cross section and curvature as illustrated at 74 in Fig. 2 for operating the device as a fluid clutch.

The auxiliary impeller 76 is provided with helically shaped vanes 162 having large cross sectional area and large curvature at the left end portion as illustrated at 86 in Fig. 3. The cross section and curvature of the auxiliary impeller vanes progressively changes to the right as viewed in Fig. 1 and at the right hand end embodies cross section and curvature as illustrated at 84 of Fig. 3.

The auxiliary turbine 118 is provided with vanes 164 of helical form having cross section and curvature at the left as illustrated at 136 in Fig. 4 and decreases in cross section and curvature to the right as illustrated at 138 of Fig. 4. Where the helically shaped vanes are employed on the guide wheel, auxiliary impeller and turbine, more accurate control of the power transmitting characteristics is possible.

This application is in part a continuation of my copending applications, Serial No. 366,686, filed November 22, 1940, now abandoned, which is itself a continuation of my Patent No. 2,222,618, and Serial No. 358,960, filed September 30, 1940.

I claim:

1. A fluid transmission comprising an impeller, a turbine cooperating with the impeller to form a fluid circuit, an auxiliary impeller and a guide wheel interconnected therewith each including a plurality of spaced channels having rectifying vanes adapted to be alternately introduced in the fluid circuit, and speed responsive means controlling the auxiliary impeller to position one of said spaced channels in the fluid circuit.

2. A fluid transmission comprising an impeller, a turbine cooperating with the impeller to form a fluid circuit, an auxiliary impeller, an auxiliary turbine, and a guide wheel each having a plurality of spaced channels with rectifying vanes therein adapted to be alternately introduced in the fluid circuit, and speed responsive means for control of the auxiliary impeller, the auxiliary turbine and the guide wheel.

3. A fluid transmission comprising a driving shaft, a driven shaft, an impeller and a turbine associated with the driving and driven shafts and cooperating to form a fluid circuit, an auxiliary impeller movable in the fluid circuit, a stationary member, a guide wheel on the stationary member interconnected with the auxiliary impeller and movable in the fluid circuit, and speed responsive means controlled by the speed of rotation of the impeller to move the auxiliary impeller and the guide wheel in the fluid circuit to operate the device as a torque converter or as a turbo clutch.

4. A fluid transmission comprising driving and driven shafts, an impeller and a turbine associated with the driving and driven shafts and cooperating to form a power transmitting fluid circuit, a stationary member, a guide wheel shiftable on the stationary member having a plurality of spaced fluid channels adapted to be alternately introduced in the fluid circuit to vary the power transmitting characteristics of the device, and means for automatically shifting the guide wheel under the influence of the fluid in the circuit and the speed of rotation of the impeller.

5. A fluid transmission comprising an impeller, a turbine cooperating with the impeller to form a fluid circuit, a stationary member, a guide wheel having a plurality of spaced channels adapted to be successively introduced in the fluid circuit, motion transmitting means between the guide wheel and the stationary member, and means controlled jointly by the speed of the impeller and the fluid reaction in the fluid circuit controlling movement of the guide wheel by the motion transmitting means.

6. A fluid transmission comprising driving and driven shafts, an impeller and a turbine associated with the driving and driven shafts and cooperating to form a power transmitting fluid circuit, a shiftable auxiliary impeller connected to the driving shaft, a shiftable auxiliary turbine connected to the driven shaft, and speed responsive means under the influence of the speeds of rotation of the driving and driven shafts operative to shift the auxiliary impeller and turbine axially with respect to the shafts.

7. A fluid transmission comprising an impeller, a turbine cooperating with the impeller to form a fluid circuit, an auxiliary impeller and a guide wheel interconnected with the auxiliary impeller each including a plurality of spaced channels having vanes therein adapted to be selectively introduced in the fluid circuit to vary the energy transmitting characteristics of the transmission, and speed responsive means under the influence of the speed of the driving shaft controlling the auxiliary impeller to selectively introduce the spaced channels in the fluid circuit.

8. A fluid transmission comprising driving and driven shafts, impeller and turbine wheels associated with the driving and driven shafts and cooperating to form a power transmitting fluid circuit, an auxiliary impeller operably connected to the driving shaft, an auxiliary turbine operably connected to the driven shaft, speed responsive means under the influence of the speeds of rotation of the driving and driven shafts controlling the auxiliary impeller and turbine members respectively, a stationary member, a guide wheel member associated with the stationary member and movable relative to the fluid circuit to selectively operate the device as a torque converter or as a fluid clutch, and speed responsive means under the influence of the speed of rotation of the driving shaft to control said guide wheel member.

9. A fluid transmission comprising driving, driven and stationary members, an impeller, a turbine and a guide wheel carried by the driving, driven and stationary members and cooperating to form a power transmitting fluid circuit to transmit power as a torque converter or as a fluid clutch, an auxiliary impeller interconnected with the guide wheel, an auxiliary turbine, and speed responsive means controlling the auxiliary impeller, the guide wheel, and the auxiliary turbine.

10. A fluid transmission comprising driving and driven shafts, an impeller and a turbine carried by the driving and driven shafts and cooperating to form a power transmitting fluid circuit, an auxiliary impeller having vanes of varying contour to vary the energy imparting characteristics of the impeller, driving means between the impeller and the auxiliary impeller, a guide wheel interconnected with the auxiliary impeller, and speed responsive means under the influence of the speed of the impeller controlling the position of the auxiliary impeller and the guide wheel.

11. A fluid transmission comprising impeller and turbine members cooperating to form a power transmitting fluid circuit, a stationary member, a guide wheel shiftably mounted on the stationary member having fluid deflecting vanes of varying contour to operate the transmission as a torque converter or as a fluid clutch, an auxiliary impeller movable concomitantly with the guide wheel, and speed controlled means under the influence of the speed of the impeller controlling the guide wheel and auxiliary impeller.

12. A fluid transmission comprising an impeller and a turbine cooperating to form a power transmitting fluid circuit, an auxiliary turbine, an auxiliary impeller, and a guide wheel each having fluid deflecting vanes of varying contour and each shiftable in the fluid circuit, and speed responsive means controlling shifting movements of the auxiliary turbine, the auxiliary impeller and the guide wheel.

13. A fluid transmission comprising an impeller and a turbine cooperating to form a power transmitting fluid circuit, a guide wheel, an auxiliary impeller interconnected therewith, and an auxiliary turbine each having fluid deflecting vanes of varying fluid deflecting characteristics shiftable in the fluid circuit to vary the power transmitting characteristics of the transmission, and means controlled by fluid reaction in the fluid circuit and centrifugal force for automatically shifting the guide wheel, the auxiliary impeller and the auxiliary turbine.

JOSEPH JANDASEK.